(No Model.) 2 Sheets—Sheet 1.
B. A. KARR & C. H. BRADRICK.
AUTOMATIC RAILWAY ELECTRIC SIGNAL.
No. 508,946. Patented Nov. 21, 1893.
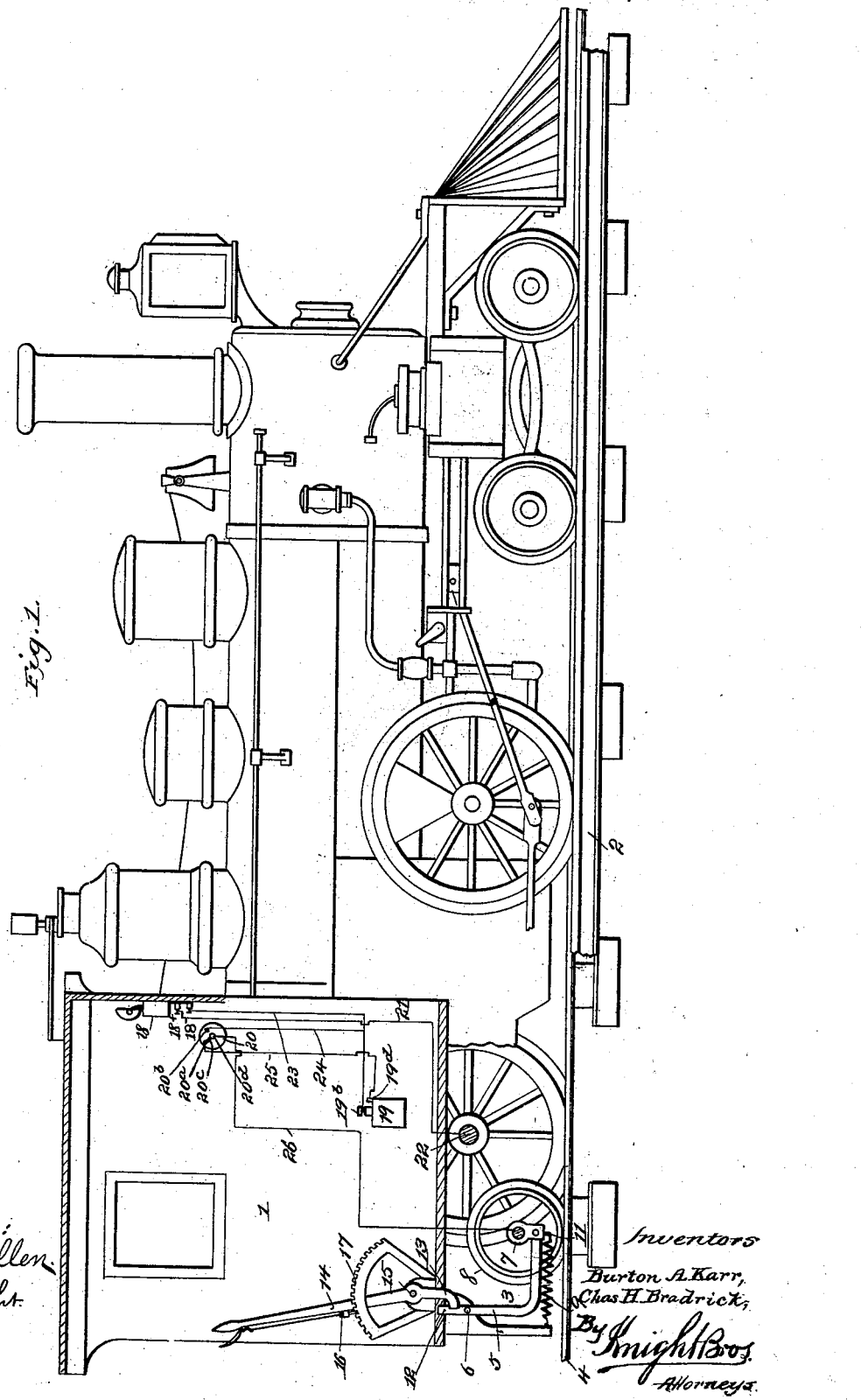

(No Model.) 2 Sheets—Sheet 2.
B. A. KARR & C. H. BRADRICK.
AUTOMATIC RAILWAY ELECTRIC SIGNAL.
No. 508,946. Patented Nov. 21, 1893.
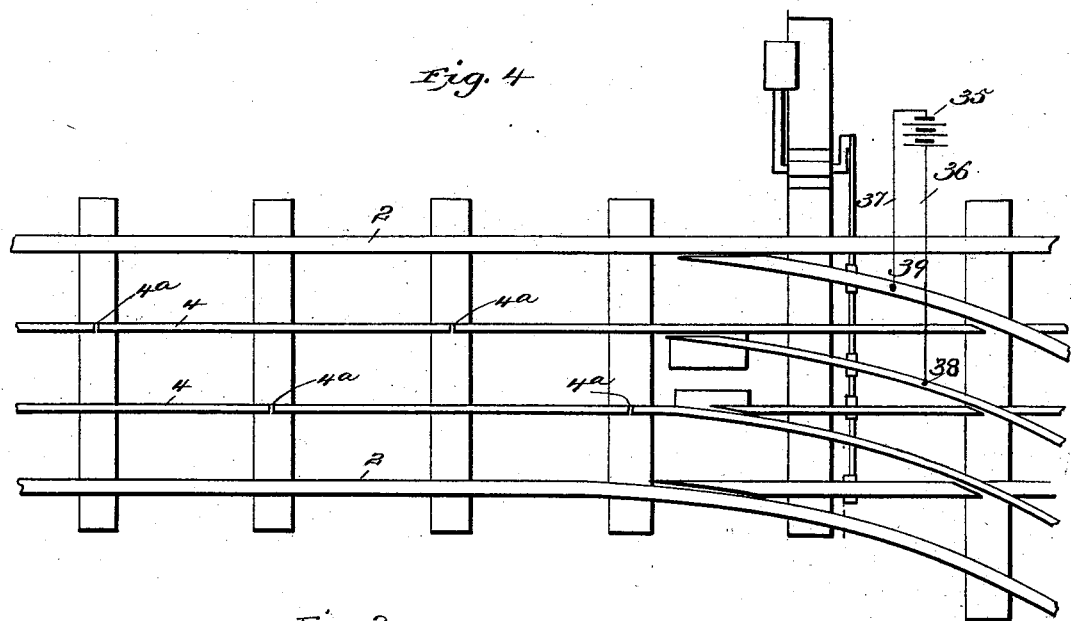
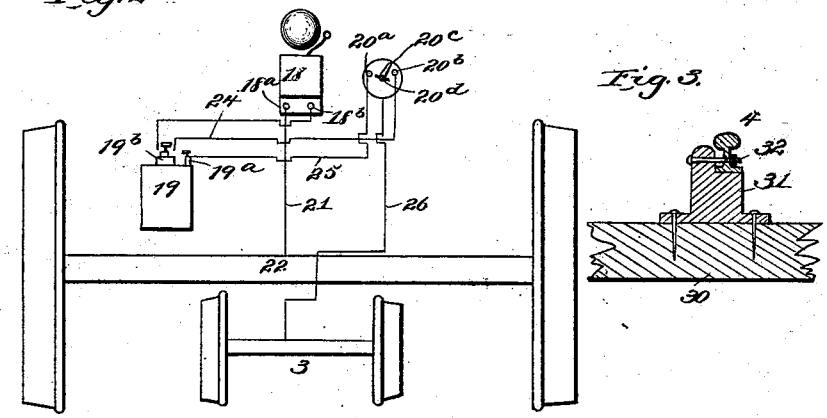
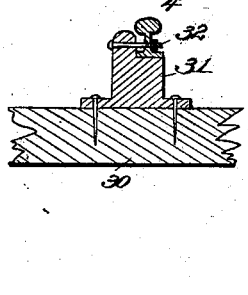
Witnesses:
Walter E. Allen
Edward D. Knight
Inventors
Burton A. Karr,
Chas H. Bradrick,
By Knight Bros.
Attorneys.

UNITED STATES PATENT OFFICE.

BURTON A. KARR AND CHARLES H. BRADRICK, OF OMAHA, NEBRASKA, ASSIGNORS TO THE NATIONAL RAILWAY SIGNAL COMPANY, OF SAME PLACE.

AUTOMATIC RAILWAY ELECTRIC SIGNAL.

SPECIFICATION forming part of Letters Patent No. 508,946, dated November 21, 1893.

Application filed December 27, 1892. Serial No. 456,386. (No model.)

*To all whom it may concern:*

Be it known that we, BURTON A. KARR and CHARLES H. BRADRICK, citizens of the United States, residing at Omaha, in the county of Douglas and State of Nebraska, have invented certain new and useful Improvements in Automatic Railway Electric Signals, of which the following is a specification.

Our invention relates to that class of electric signals for railways which employ the main railway tracks as one line conductor, insulated central rails as the other line conductor and a trolley carried by the car and running on the central track and wherein each engine carries an alarm, a source of electricity and proper connections for making a complete half circuit, the central insulated conductors being divided into sections and the circuit through both engines being completed when they arrive upon the same section.

Our invention consists in certain novel features in the construction and arrangement of the parts in such a system as will hereinafter be fully described and particularly pointed out in the claims.

In the accompanying drawings:—Figure 1 represents a locomotive the cab of which is shown in section, and to which is applied one of the two similarly constructed halves of the system which, when brought together give the alarm in both cabs. Fig. 2 is a diagram showing the electrical connections which are employed on each locomotive. Fig. 3 represents in transverse section the manner of mounting the elevated central rails on the roadbed. Fig. 4 represents in plan and diagram the connections at a switch which serve, when the switch is open to complete the circuit carried by any approaching engine and thus give an alarm.

1 represents a locomotive adapted to run upon the main rails 2 and which carries a trolley 3 of peculiar construction hereinafter referred to, which runs upon central elevated rails 4. The trolley consists mainly, of a frame 5 having vertical and horizontal arms, pivoted at 6 and carrying an axle 7 upon which is mounted a pair of wheels 8. This trolley is mounted in a bracket 10 from the lower end of which projects a spring 9 whose outer end is attached to the trolley axle, in such manner as to draw the forward end of the trolley-frame with its wheels backward and owing to the shape of the frame press the wheels downward upon the track upon which they run. This spring retains the wheels of the trolley upon the track, with a yielding force, causes them to ride evenly, and prevents them being displaced by obstructions such as slight unevenness in the track. As will be observed from Figs. 2 and 4 the central elevated tracks and the trolley-wheels that run thereon are spaced apart so that the rails form two independent conductors and the trolley being supported by the single bar 5 attached near the center of the axis receives current from either central rail. The trolley-frame is also provided with an extension 12 above its pivot 6, which may be engaged by though not positively connected with, the lower projection 13 of a controlling hand-lever 14 pivoted at 15 in the cab. This hand lever is provided with a retaining dog 16 which engages in the teeth of a rack segment 17 adjacent to which the lever moves. The operation of these parts is such as to permit the engineer to conveniently elevate, and retain in elevated position, the trolley wheels, at such times as the engine may be traveling on switches or other portions of the track where the central rails are not used, but may throw the lever rearward a sufficient distance to wholly disengage the parts 12 and 13 and thus leave the trolley-frame intact with freedom of vibration in performing its intended functions.

18 represents an alarm of any suitable construction.

19 represents a battery or other suitable source of electricity and 20 represents a switch-board.

The alarm 18 has positive and negative binding posts $18^a$, $18^b$ connected respectively by means of a wire 21 with an axle 22 of the engine and by a wire 23 with the negative pole $19^b$ of the source of electricity. The switch-board 20 has a switch-arm $20^c$ and two contacts $20^a$, $20^b$ connected respectively by wires 24, 25, to the negative and positive poles of the battery. The switch-board is also connected at its pivot $20^d$ upon which the arm $20^c$ turns, by means of wire 26 with the axle 7 of the trolley. From the foregoing it will be observed that when the switch-arm $20^c$ is turned upon the contact $20^a$ the following circuit will be established, provided an engine, an open switch, an impaired bridge or similar cause for alarm, be present, to wit: from the car axle 22 through wire 21 to the alarm, from the alarm through wire 23 to the negative pole of the battery, from the positive pole of the battery through wire 25 to the contact 20$^a$ of the switch, through contact arm 20$^c$ of the switch and wire 26 to the trolley 3, along the central rails, or that one of them with which contact is made by both the approaching objects, through the circuit of the other of which is to be avoided, and back through the main rails to the axle 22.

According to our system it is intended that all engines going east or in any other predetermined direction shall place the switch 20 so as to prevent, say the positive to the trolley and through it to the central rails, while all engines going in the opposite direction will cut out the battery but leave electrical connections otherwise intact to receive current from the battery of the other train or obstruction. It will be seen that the wiring as we have described it is adapted for this particular use.

The change for cutting out the battery but leaving the connections ready to receive the signal, is effected by moving the arm 20$^c$ of the switch from the position shown in Fig. 1 and in connection with which position the circuit has just been described, and shifting said switch-arm over on the contact 20$^b$, during which latter position of the switch, the circuit will be as follows:—from the positive pole of the battery (which according to the plan mentioned will now be turned in circuit), on the other engine, to the central rails, along that one of the sections of the central rails with which both objects are simultaneously in contact, up through the trolley 3 of the engine whose battery is cut out, along wire 26 to pivot 20$^d$, through arm 20$^c$ to contact 20$^b$, through wire 24 to negative pole 19$^b$ of the battery, then without going through the battery (because the conductor 25 from the positive pole 19$^a$ now terminates at the contact 20$^a$ of the switch-board) but along the wire 23 to the alarm, then through wire 21 from the alarm to axle 22 and through main track 2 to the other object from which the current is supplied. Such a system will be found to be convenient because most roads give even numbers to all trains going in one direction and odd numbers to all trains going in the opposite direction. With such the rule would be that all even numbers run with battery in circuit and all odd numbers run with battery out of circuit.

The elevated central rails are divided into sections of equal lengths which are laid so as to break joints, that is to say, each section on one side terminates opposite the middle of the adjacent section on the other side. The ends of these rails forming the central elevated track may either be simply spaced apart or they may be insulated by interposing suitable insulating material. These rails we prefer to mount on the cross ties 30 by means of blocks or chairs 31 at suitable intervals apart, to which the rails 4 of said inner track are secured by bolts 32, the weight upon the central rails being inconsiderable.

The chairs 31 may be placed a sufficient distance apart to leave the space between them, and beneath the rails 4 open and unobstructed. This is a very important point in the successful operation of the system as it enables us to overcome one of the most frequent causes of impracticability in systems of the class to which our invention belongs. We refer to the effect of accumulating snow and ice between the rails which results in short circuiting by connecting the inner and outer rails and thus giving an alarm unnecessarily in the engine. With the rails set up as described it is an easy matter to keep the space around them swept clean and free of obstructions.

In guarding switches, a simple battery 35 is used with wires 36 and 37 running from its respective poles and connected at 38 and 39 to the main and central tracks of the switch, which are adapted when thrown against corresponding rails of the main line, to open the switch, and close that half of the circuit, so that an engine approaching will receive the alarm. If the road is working under a rule which provides for the attachment of the positive wire to the trolley on the central track, then the negative wire 36 of the local switch battery 35 will be connected to the central track so that the currents of the locomotive and switch batteries will reinforce rather than oppose each other. When an engine is going in the opposite direction and its battery is cut out according to rule, it receives current from the local battery without interruption.

While we have shown what we consider to be the most convenient form of wiring for the different parts of our system in connection with the mechanical features of the system, we do not limit ourselves to the use of this precise wiring for the reason that it may be found necessary to alter the same as circumstances and conditions of the parts to which it is to be applied may dictate.

Having thus described our invention, the following is what we claim as new therein and desire to secure by Letters Patent:

1. In a railway electric signal, the combination of the main track, the locomotive adapted to run thereon, the central track and the trolley carried by the locomotive and adapted to run upon the central track and consisting of the pair of wheels, a downwardly and forwardly projecting arm on which the wheels are mounted, and the spring for drawing the wheels down upon the track, attached to the forward end of the frame and passing to a fixed point on the engine behind it, substantially as herein set forth.

2. In a railway electric signal, adapted to operate substantially as described, the trolley consisting of the pair of wheels, the downwardly and forwardly extending frame on which the wheels are mounted and which is pivoted at its upper end to the locomotive, the spring connecting the lower end of the trolley with a fixed point on the locomotive for holding the wheels down, and the pivoted elevating lever bearing against but disconnected from the frame of the trolley all substantially as herein set forth.

3. The herein described trolley for railway electric signals which consists of a wheel running upon the conductor, the pivoted frame upon which the wheel is mounted consisting of the vertical and horizontal arms and having a spring for rocking it on its pivot and holding the wheels down upon the conductor, the pivoted lever having its lower end adapted to come in contact with and bear against the pivoted lever of the trolley, a dog on the lever and a rack segment in proximity to which the lever moves, all substantially as and for the purposes specified.

4. In a railway signal system, the combination of the main track and the central two-rail trolley track formed of insulated break-joint sections, a car running on the main track and having a trolley running on the central track, the working electrical connections in the car consisting of a suitable signal, a battery, a switch having its lever electrically connected with the trolley, and having two contacts connected with the respective poles of the battery, electrical connection between the negative pole of the battery and the car wheel and a railway switch having main and trolley tracks arranged for movement to deflect the car and trolley, and having a local battery with its negative pole connected to the central switch track and its positive to the main track of the switch, whereby trains running in opposite directions with their batteries in and out respectively will each get the signals, from the other and from the open switch as explained.

BURTON A. KARR.
CHARLES H. BRADRICK.

Witnesses to Burton A. Karr:
W. H. DE FRANCE,
DELIA L. GORE.

Witnesses to Charles H. Bradrick:
I. A. BRADRICK,
H. S. KNIGHT.